United States Patent [19]
De La Brèteque et al.

[11] 3,887,681
[45] June 3, 1975

[54] SEPARATION OF GALLIUM FROM ALKALINE LIQUORS USING ACETYLACETONE

[75] Inventors: Pierre De La Brèteque, Marseille-St. Louis; Marc Beerli, Paris, both of France

[73] Assignee: Swiss Aluminum Ltd., Switzerland

[22] Filed: Oct. 5, 1972

[21] Appl. No.: 295,277

[30] Foreign Application Priority Data
Oct. 6, 1971  Switzerland...................... 14556/71

[52] U.S. Cl. ................. 423/112; 423/624; 423/119
[51] Int. Cl. ....... B01d 11/00; B01j 1/04; C01f 1/00; C01f 3/00; C01f 7/00; C01g 15/00; C22b 21/00; C22b 35/00; C22b 61/00
[58] Field of Search ........ 75/101 BE, 121; 423/111, 423/112, 624, 119, 121

[56] References Cited
UNITED STATES PATENTS
3,254,948   6/1966   Stromberg et al. ................. 423/112

OTHER PUBLICATIONS
Star'y, The Solvent Extraction of Metal Chelates, 1965, p. 34, 51–78, 175.

*Primary Examiner*—Oscar R. Vertiz
*Assistant Examiner*—Eugene T. Wheelock
*Attorney, Agent, or Firm*—Robert Irving Williams

[57] ABSTRACT

A process for separating gallium which is dissolved in an aqueous alkaline solution comprising the steps of adding to the solution a complexing agent which is a compound of the $\beta$-diacetone type, and extracting the complex by means of an organic solvent.

4 Claims, No Drawings

SEPARATION OF GALLIUM FROM ALKALINE LIQUORS USING ACETYLACETONE

The present invention concerns a process for the direct separation of gallium contained in the dissolved state in solutions of sodium aluminate, the gallium thus separated then being capable of being easily treated by known processes, with a view to obtaining it in metal form.

Properly speaking, minerals of gallium are not known at the present time. This metal, although relatively abundant in nature, is very dispersed. It can be obtained at present as a by product in the extraction of zinc, germanium, and especially aluminium. The last case is in fact particularly favourable, for the gallium is usually already in aqueous solution. In the most common case, the solutions are from the Bayer process, well known in itself for the production of aluminium oxide (or alumina); the sodium aluminate solutions contain, for example, quantities of the order of 60 to 90 milligrams of gallium (expressed in terms of the gallium alone) per 100 grams of sodium hydroxide.

Various processes have been developed with a view to extracting gallium from these solutions. Among them can be mentioned in particular a process of fractional carbonation and another of fractional caustification of the aluminate solutions. The two aim to obtain solutions deprived of elements other than the gallium, and to progressively enrich the said solutions in this metal by repetition of the operations. When the gallium content of the solutions is sufficiently raised the metal can be extracted from it by relatively simple means.

A more recent process, due to the applicant and industrially exploited, consists in electrolysing sodium aluminate solutions with a cathode of agitated mercury. The movement causes an increase in the discharge potential of the hydrogen ions and hence an addition to their resulting reducing energy in the separation of the gallium; if the electrode were not suitably agitated, there would be no separation. This process presents, however, the inconvenience of an immobilisation of relatively important quantities of mercury, a metal which is rather expensive and which has to be handled with special precautions.

Equally known are processes for separating gallium salts by the formation of complexes and extraction by organic solvents. These complexes are however most often obtained in an acid medium, as is the case, for example, for the numerous complexes utilising the tetrahalogenogallate ion well known by the formula $(GaX_4)^-$, in which X is a halogen (F, Cl, Br, I). Certain complexes are also obtained in a neutral or alkaline medium, but it is then still a case of ionic compounds, such as the substituted thiocarbamates or complex oxalates and malonates, which are hence not extractable in an organic phase. The only extractable gallium complex in an alkaline medium known at the present time is a derivative of 8 - hydroxy quinoline; but in that case the complexing agent is an expensive compound, more relevant to analytical than industrial chemistry.

The process according to the invention aims to obtain gallium by directly treating solutions which are alkaline, even strongly alkaline, in which it is dissolved, without having recourse to the known processes such as employ a mercury cathode but while safeguarding, as in the last case, the nature of the mother liquors which can hence be re-utilised. In other words, the process according to the invention aims to obtain the same advantages as the mercury cathode process while avoiding the inconveniences.

According to this invention, a process for separating gallium which is in an aqueous alkaline solution, comprises adding a complexing agent which is a compound of the $\beta$-diacetone type, and extracting the complex by means of an organic solvent which is substantially immiscible with water, the complexing and the extracting being performed in alkaline medium.

It is in effect very interesting, from the practical point of view, that the operation of complexing and extraction can occur in an alkaline medium. That permits, for example, the direct treatment of the aluminate solutions containing gallium and permits them to be re-utilised after extraction of the latter, in the production cycle of aluminium oxide. Thus, different from what is produced by applying an acid extraction process, the aluminate solutions are not at all "destroyed" by the alkaline extraction process according to the invention; in the particular case there is therefore no consumption or loss of acid, of caustic soda or aluminium. That constitutes an appreciable advantage with respect to the known acid extraction processes.

The applicants' researches have made it possible to establish that not only the $\beta$-diacetones, such as for example the ethyl-aceto-acetate, acetylacetone, dibenzoyl-methane, can serve as complexing agent, but equally well their sulphur analogues such as thiodibenzoyl methane or their halogen substituted derivatives such as tri or the hexachloro or fluoracetylacetone. These compounds present diacetone functional groupings in equilibrium, with an enolic form:

the enolic form gives a covalent bond with gallium and the compound obtained is stabilised by the addition of the oxygen doublet on the gallium, giving a coordinate bond:

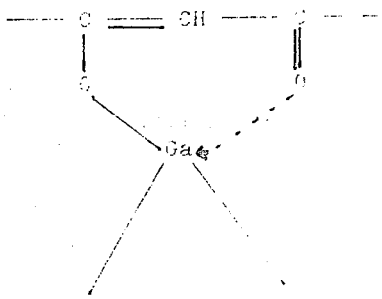

Thus for each mole of trivalent gallium, three moles of diacetone are involved.

Another feature of the invention is the choice of an appropriate organic solvent for the extraction of the gallium-diacetone complex from the aqueous phase. The best results, relating to the extraction yield and to the economy of the process, has been obtained by the applicant when using isobutanol and its homologues (isopropanol, etc) as well as benzene and its homologues (toluene and xylene); one can however use carrier solvents of other functional groups, for example methylsobutylacetone and cyclohexanone.

On the other hand, with other less appropriate solvents there can be a certain degradation of the β-diacetone functional complexing agent with breaking of the carbon chain.

It is preferable that the complexing and the extraction take place simultaneously. If in contrast, and for example, the complexing agent is first added to the solution of sodium aluminate in which the gallium is dissolved, there usually forms a precipitate rich in soda and alumina; the subsequent addition of the organic extraction solvent permits the gallium complex, of which the covalencies are more stable, to pass into the organic phase with excess of the complexing agent, whereupon the aluminium based compounds and sodium based compounds re-dissolve and stay in the aqueous phase. To avoid having to re-dissolve a precipitate, the preferred mode of carrying out the process consists in simultaneously adding the complexing agent and the solvent to the aqueous solution containing the gallium salt to be extracted.

The alkali concentration of the aqueous phase can play a certain role. In practice, the process is applicable even to very concentrated alkaline solutions; however, the best results have been obtained when the soda content, expressed in $Na_2O$, does not exceed 180 g/l. By another way the concentration is one of the principal parameters bearing on the economy of the process on the industrial scale; it must therefore be studied in each particular case.

The temperature of the complexing and extraction operations is not critical. It can take place at ambient temperature and equally at elevated temperature, for example about 40° to 50°C, relating to the type of extraction solvent chosen, the nature of the aqueous solution etc.

The applicants have ascertained that the minor elements contained, for example in an industrial solution of sodium aluminate, do not interfere at all in the operation of the process, in contrast to what happens in the majority of conventional processes. That constitutes a considerable advantage and contributes to obtaining an excellent quality of gallium.

The examples described below all start with industrial solutions of sodium aluminate, used in the production cycle of alumina.

EXAMPLE 1

50 ml of a solution of aluminate containing among other things about 100 g/l of $Na_2O$, 44.5 g/l of a $Al_2O_3$ and 0.12 g/l of gallium, are treated by the mixture consisting of 80 ml of isobutanol and 13 ml of acetylacetone. After agitating for 10 minutes at ambient temperature the two phases are separated. The aqueous phase contains no more gallium which can be detected by analysis (less than 1 part per million); therefore practically all the gallium has passed into the organic phase.

EXAMPLE 2

25 ml of the same aluminate solution as for the first example have been treated by a mixture consisting of 20 ml benzene and 5 ml acetylacetone. After agitating for 10 minutes at ambient temperature it has been ascertained than 99 percent of the gallium contained in the aqueous phase had passed into the organic phase.

EXAMPLE 3

50 ml of an industrial sodium aluminate solution containing, among other things, about 180 g/l $Na_2O$, 80 g/l $Al_2O_3$ and 0.20 g/l Ga, are treated by a mixture consisting of 80 ml isobutanol and 25 ml of acetylacetone. After being agitated for 10 minutes at ambient temperature the extraction of gallium from the aqueous phase is practically total.

The gallium contained in the organic phase can then be easily separated by methods known in themselves (for example distillation of the solvent, salting out); the solvent is used for further extractions.

As has been said, the process is particularly convenient for the extraction of the gallium contained in sodium aluminate solutions recycled in the Bayer process for alumina production. But equally well it can be used to treat absolutely any other alkaline solution containing gallium.

On the other hand, from the fact that the complexing and extraction operations are very rapid, it can be forseen that the installations necessary for carrying out the process will be relatively simple, compact and economical.

Obviously, various modifications can be added by anyone skilled in the art, to the process just described referring to the non-limiting examples, without departing from the scope of this invention.

What is claimed is:

1. A process for separating gallium from solution which comprises adding to an aqueous solution of aluminate in which gallium is dissolved, and containing between about 100 grams per liter and about 180 grams per liter of $Na_2O$, acetylacetone as a complexing agent, and extracting the complex by means of an organic solvent which is substantially immiscible with water.

2. A process according to claim 1, in which the complexing and the extraction are performed simultaneously by treating the aqueous alkaline solution with a mixture formed by the solvent and the complexing agent.

3. A process according to claim 1, in which the solvent is isobutanol or one of its homologues.

4. A process according to claim 1, in which the solvent is benzene or one of its homologues xylene or toluene.

* * * * *